United States Patent Office 3,576,728
Patented Apr. 27, 1971

3,576,728
ELECTROPHORETIC COATING PROCESS
Noel A. Smith, Warren, and John L. Petty and Helen O. Slywynsky, Detroit, Mich., assignors to The Sherwin-Williams Company, Cleveland, Ohio
Filed Mar. 20, 1968, Ser. No. 716,281
Int. Cl. B01k 5/02; C23b 13/00
U.S. Cl. 204—181                               24 Claims

ABSTRACT OF THE DISCLOSURE

An organic phase is dispersed in a alkaline aqueous phase by addition of polar dispersing agent miscible with organic phase. These emulsions are useful for coating self-terminating polymer films on conducting substrates by electrophoresis. The electrocoating process is useful for high speed continuous and semi-continuous operations. The electrocoating baths can be replenished from a concentrate material without disproportionate buildup of bath components. High electrical efficiency is realized in weight of film deposited per unit of current. Eelectrodeposited films provide excellent corrosion resistance to metal substrates with thin films of about 10 to 50 microns thickness.

BACKGROUND OF THE INVENTION

The emergence of electrocoating as an important industrial operation has been observed with intense interest by workers in the field of organic polymer coatings. The most important economic uses of electrocoating have been for painting base metals to provide a primer coat having excellent corrosion resistance and for one-coat finishing processes. While many mechanisms are proposed to explain the phenomena of electrocoating, the chemistry of depositing films from an aqueous bath by electrophoresis remains largely empirical.

There are numerous advantages of water-based paints over those employing organic solvents—lower cost of materials, uniformity of coating thickness, adaptability of electrocoating to continuous and easily mechanized painting lines, reduced toxicity and fire hazard, ability to deposit films on articles having complex configurations, and reduction of paint losses during application.

In practice, electrocoating is an immersion process wherein an organic polymer dispersion in a coating bath is transported toward a conductive surface which is biased with a direct current potential.

PRIOR ART

Migration of large molecules or particles in a liquid medium under electrical potential is a phenomenon which has been studied extensively by electrochemists. Such electrophoretic movement has been found useful for depositing various materials on electrically biased objects. Numerous materials, including metals, inorganic compounds, organic polymers, natural resins and oils, have been coated onto electrodes by this process. Deposits can be made on a cathode or anode depending upon the composition of the coating bath; but, most attention has been given to anodic deposition because the materials to be deposited usuall form negatively-charged particles in the liquid medium.

Electrophoretic coating baths are usually classified as emulsions or solutions. In the former, particles of insoluble coating material are suspended in the liquid phase, usually with a surfactant dispersing agent. In the latter, the coating material forms a homogeneous solution with the liquid to constitute a single phase. Some of the early work in applying organic coatings to metals involved rubber latexes and synthetic resins emulsified in water with anionic surfactants. These materials built films several millimeters thick over a period of several minutes to an hour or so. Generally, copious amounts of water were co-deposited with the gel-like coagulated deposits and permitted migration of water and ions through the film. It was frequently observed that the film became dehydrated by electroendosmosis in the deposited film, but the electrically-insulating properties of the films necessary to self-termination of the coating were slow to develop. Also, the surfactants used in emulsifying the latexes were co-deposited and were deleterious to the film, especially with regard to corrosion resistance.

The characteristics of typical prior art emulsion electrodeposition systems are described by Fink and Feinleib in Trans. Electrochem. Soc., 1948, 94, 309; and Yeates in "Electropainting," Robert Draper Ltd., 1966. Numerous film-forming coating materials have been electrocoated from emulsion type baths, including polymerizable oils, natural resins and various water-insoluble polymeric vehicles.

Electrocoating from baths containing soluble film-forming materials has grown rapidly in recent years. An early report of such systems of Japanese Pat. No. 144,755 described the deposition of an anionic residue ion of urushiol (shellac) from an ethanol solution by electrophoresis. Synthetic polymers containing carboxyl groups have been solubilized in water with amines or ammonia and anodically deposited. These materials and processes are described by Gray in U.S. Pat. 2,530,366 and Gilchrist in U.S. Pats. 3,230,162 and 3,304,250. These solubilized resinous materials are generally of a relatively low molecular weight and the deposits retain hydrophilic sites which can become points of attack during corrosion of base metals. In the prior art solubilized resins were advantageous in that they formed a self-limiting insulative film very quickly as compared to the time required for termination of deposition from an emulsion bath.

SUMMARY OF THE INVENTION

This invention relates to coating compositions for depositing an organic film. It also describes methods for dispersing an insoluble organic material in an aqueous bath and electrochemical methods for depositing a polymeric film from the organic phase onto a substrate. In particular, the invention relates to the preparation of a stable emulsion by mixing an insoluble non-ionizable organic material, a polar dispersing agent, and alkaline water to form a dispersed organic phase, which may contain pigment particles.

The invention further relates to electrocoating methods for depositing a uniform layer of paint, varnish or lacquer onto an electrically conductive surface, using new coating compositions and dispersion methods.

DESCRIPTION OF THE INVENTION

It has been found that a stable emulsion of water-insoluble organic material can be formed by suspending organic particles in an alkaline aqueous phase with a polar dispersing agent. The organic materials are usually film-forming resins, but organic monomers, oils, etc., can also be dispersed by this invention.

The dispersants (dispersing agents) used for forming stable emulsions of polymeric material in aqueous media can be selected from a variety of polar compounds to produce stable dispersions and quality coatings. They should not react deleteriously with the other bath components or degrade the organic film when deposited by electrocoating methods. Since the dispersants often contact operating personnel in the liquid or vapor phase, they should not be hazardous to handle with ordinary care. The preferred dispersants are liquids at ambient temperature or at the operating temperature of the electrocoating bath and are capable of being removed from the deposited organic coating by heating, which is usually used to cure the polymeric material.

Several properties of the dispersants merit consideration in selecting the proper dispersing agent for any given bath composition. The preferred dispersants have little or no solubility in the aqueous phase; however, this property is not critical to an operable system if the dispersant has sufficient miscibility with the polymeric material to form a stable organic phase. Some dispersants such as acetone which are soluble in water perform in a satisfactory manner in some systems; but, as a general criterion for selecting dispersants, the water solubility is a property to be considered. It is preferred that any dispersant present in the aqueous phase does not change the density of the continuous phase substantially.

Relative volatility or decomposition of the dispersant should be considered in most situations. Sufficient vapor pressure or thermal breakdown at curing temperatures to permit removal of the dispersant from the deposited film by heating is desirable, but high vapor pressure at the operating temperature of the bath results in dispersant losses from an open tank. Most of the successful dispersants discussed herein have been selected to provide vaporization or decomposition compatible with safe and economical electro-coating in an open tank.

The most important considerations in selecting a dispersant are the dipole moment and dielectric constant of the molecule. Those dispersants found to form stable dispersions of non-ionic polymers in water have a relatively high dipole moment. This is a mathematical quantity characteristic of a dipole unit equal to the product of one of its charges times the vector distance separating its charges. The dimensions of dipole moment may be expressed as coulomb-meters, electrostatic units, or statcoulomb-cm.; but the term most used is Debye units ($\mu = 10^{-18}$ statcoulomb-cm.). The polarization dielectric constants described herein represent the permanent dipole of the individual molecules used as dispersants. Measurement of the dipole property is described by C. P. Smyth in "Physical Methods of Organic Chemistry," Interscience Publishers (1946). Although the dispersants used in this invention are usually liquid or solid at ambient temperature, there is sufficient correlation between the dipole values for the liquid state and gaseous state of the molecule to aid in selecting dispersants.

For proton acceptor molecules there is usually less than 10% deviation between dipole measurements made in the gaseous state and those made by dissolving the compound in an inert liquid, typically benzene or dioxane. The dipole of water has been reported from $1.84\mu$ (gas) to $1.89\mu$ (liquid in dioxane solution).

A dipole moment higher than that of water ($1.84\mu$) has been found common to the successful dispersants, and the preferred materials have a dipole between 2 and 5 Debye units. Optimum emulsion stability was found with dispersants having a dipole between 2.9 and 4.7.

In selecting a dispersant compound a second important property, which can be correlated with dipole for many molecules, is dielectric constant ($\epsilon$). Those dispersants found to be operable for forming stable emulsions of water-insoluble organic materials possess a dielectric constant lower than water, for which the dielectric is about 78–80 in the operating range of most electrocoating processes. The preferred range of dielectric constants for the polar dispersants is about 2 to 60, with 10 to 40 appearing to be optimum for the compounds tested.

Ionization of dispersant compounds in water has been found to be relatively low. Most suitable dispersants form no ions or ionize very slightly in water.

Several classes of organic compounds have been found operative to disperse the water-insoluble polymers. These include amides, ketones, esters, benzenoids, ethers, nitriles, substituted alkanes, and halogenated hydrocarbons.

The compounds found to be operative for dispersing polymers according to this invention posses few common structural similarities. However, the molecular structure should contain a proton acceptor group and be substantially free of proton donor groups. This criterion eliminates most organic acids, alcohols and aldehydes as suitable dispersants. It should be noted that dispersant compounds can have more than one functional group, at least one of which should be a proton acceptor. For instance, a weak proton donor group which alone would not provide the necessary dispersing properties may be included with a second proton acceptor functional group in a molecule with a net effect that permits the compound to function as a dispersant. Position of substitution in organic molecules can be very important in its effect on dipole moment. Di-substituted benzenoid compounds are an example of this situation. Ortho-substituted compounds often have a much higher dipole moment than the corresponding meta or para isomers. Relative position of functional groups can also strongly affect the proton acceptance property of a molecule.

The amount of dispersant needed to form a stable emulsion does not appear to be critical. The weight ratio of insoluble organic material to dispersant in the organic phase can be as great as 200:1. There appears to be no theoretical upper limit, but no increase in emulsion stability or film properties is achieved by increasing the amount of dispersant above the normal operative level. The preferred range of insoluble material to dispersant is 200:1 to 5:1. In most of the emulsions studied, the organic phase contained 5 to 10 wt. percent dispersant.

The non-ionogenic polymeric materials used in making electrocoating dispersions are substantially different from those polymers electrodeposited in prior art processes. The most important property of polymers used in this invention is the absence of ionizible sites in the macromolecule. Free acid groups or groups such as esters or salts which form ions under the conditions of dispersion or electrocoating do not form stable dispersions by the mechanism used herein. It has been found necessary to render inactive any substantial amount of these ionizible sites present in these macromolecules before dispersing the organic material in aqueous media. In general, materials with acid values below about 15 are operable in this invention. Prior art processes for electrocoating frequently use high acid materials such as polycarboxylic resins solubilized with amines, ammonia, or alkali metal hydroxides to form salts of the polycarboxylic acids. In these prior processes, acid values of at least 30 were needed to form stable solutions or dispersions.

Numerous classes of organic resins have been dispersed by the polar dispersing agents used in this invention. Typical polymers include ethers, esters, phenolics, vinyls, and oil-modified alkyds in a wide range of molecular weights, usually above about 1500. Prepolymers co-deposited with cross-linking agents can be cured by heating the deposited film. Typical of this type of film-forming material are those prepolymers containing free hydroxyl groups which can be cross-linked by reaction with melamine compounds. Also, thermoplastic materials can be fused to form a homogeneous coating after deposition in order to obtain maximum coating durability and corrosion resistance.

In order to be self-terminating when electrocoated, the polymer should be an electrical insulator. Therefore, the dielectric properties of the polymer as well as the dispersant are important.

Other non-ionic organic materials besides polymers have been successfully dispersed by the new process. Liquid monomers can be coated electrophoretically and polymerized in situ as a film. Numerous non-ionic organic materials such as oils, hydrocarbons, etc., can be emulsified in water by the dispersants described herein and the range of uses for these emulsions is wide.

The aqueous phase of electrocoating baths in this invention comprises a major portion of typical coating compositions. This is usually 85% to 99.5% by weight, preferably 90 to 95%. The more dilute baths do not lose as much solid matter from dragout as do those baths containing large amounts of dispersed solids which are usually more viscous. Ions are formed in the aqueous phase by dissolving an organic base or inorganic base in water. The ionizible compounds present in the aqueous phase are usually introduced into the bath with the make-up concentrate containing polymer, pigment and dispersant. Dispersions of water-insoluble polymers in alkaline water have been made with an aqueous phase containing lithium hydroxide, ethanolamine, morpholine, triethyl amine, and ammonia. Stable polymer dispersions for electrocoating have been made having a pH above 8.5, usually above pH 9. The preferred embodiments of this invention are alkaline baths having pH of 9.5 to about 11.

In operating an open electrocoating tank with a highly alkaline bath, absorption of carbon dioxide from the atmosphere can pose problems. If amines are used as the source of hydroxyl ions in the aqueous phase, their reaction with carbon dioxide should be considered. Tertiary amines are less reactive than secondary or primary amines. If alkali metal hydroxides are used in a high pH bath, absorption can be high. Lithium hydroxide forms an insoluble carbonate which is codeposited with the organic particles and can be used as a scavenger for carbon dioxide.

The overall electrical conductivity of the baths is primarily a measure of the aqueous phase conductivity. A large amount of heat is released in the bath during electrocoating as a result of electrical energy dissipation. At the operating temperature of the electrocoating process, bath resistivity has been observed in the range of about 800 to 17,000 ohm-cm. The resistance can vary considerably during bath depletion and continuous processing.

The pigments which can be used with this invention include a wide variety of colors and physical properties. Most of the pigments used are included in the organic phase of the dispersion; but some hydrophilic pigments, such as titanium dioxide, may be present in the aqueous phase and can be codeposited with the organic phase. The preferred pigments are those having a particle size in the sub-micron range. High electrical resistivity is also desirable. Red iron oxide and carbon black are used in many of the examples set forth herein. Black iron oxide, a magnetic material which will not migrate in the usual electrocoating baths, can be incorporated into the organic phase and deposited according to this invention. Extender pigments can be deposited also. For instance, hydrophobic silica can be used for improving corrosion resistance and increasing throwing power in electrocoating baths. Yellow coatings can be produced using lead chromate or organic pigments. Various phthalocyanines can be used for colored pigments. Metal particles, such as aluminum flake, are also operable.

Theory of charge formation

To explain the stability of emulsions made according to this invention and electrophoretic migration of the suspended particles, a brief consideration of the theory of charge formation is desirable. The discussion of theory is intended only to facilitate understanding of the invention and is not considered binding upon the claims appended to this specification.

It is known that a charge is formed when a particle of low dielectric material is suspended in a liquid of higher dielectric. Thus, merely suspending an organic polymer of low dielectric in water forms charge sufficient to permit migration toward an electrode. However, such charge is not sufficient to keep the particles in suspension. In dispersing a typical polymer in the present process, a viscous mixture of the polymer with a dispersant is subjected to a high shear dispersing device, such as a sonic agitator, while gradually adding alkaline water to the mixture. The organic material is broken into small particles which form a discrete phase. Likewise, the dispersion can be formed by adding the organic phase gradually to the alkaline water phase under high shear agitation. Energy is imparted to the particles during shearing. Particle size can vary widely and may be as low as 0.01 micron or smaller, or as large as 100 microns. In pigmented compositions where the pigment particle is about 0.1 micron, several pigment particles can be present in larger dispersed organic particles. In a typical coating composition a spheroidal particle up to 25 microns diameter is considered optimum.

The polar dispersant is believed to be sorbed about the particle surface and may be oriented by its polar property. There is no observed chemical reaction between the dispersant and organic polymer; but, the dispersant is miscible or chemically compatible with the other components of the organic phase. A relatively fluent, but not necessarily liquid, dispersant facilitates orientation at the surface.

The aqueous continuous phase contains a statifield of ions which hold the charged organic particles in suspension. Sorption of the polar dispersant by the organic particles is believed to form a Stern double layer around the particle resulting in a net negative charge relative to the aqueous phase. This inductively polarized particle retains a static field surrounding the dispersed particle. Functional groups in the dispersant molecule render the dispersant a proton acceptor. Affinity of the dispersant for protons from water forms hydroxyl ions at the surface of the dispersed organic phase.

Of the numerous organic compounds possessing high dipole moment, those having a hydrogen atom in the functional group appear to be undesirable as polar dispersants. This can be attributed to hydrogen bonding of the functional hydrogen. The tendency of alcohols, acids, amines, and oximes (like water itself) to form intermolecular bonds renders these compounds unsuitable for dispersing water-insoluble materials by the charge induction mechanism. A discussion of hydrogen bonding and its relation to dipole, dielectric and proton acceptance is given by Pimentel in "The Hydrogen Bond," Freeman and Co. (1960). While some degree of association between molecules of dispersant compounds may be present, it is generally quite low and may not be due to the hydrogen bonding phenomena. Cryoscopic molecular weight experiments on N,N-dialkyl amides, for instance, has given evidence of only slight association.

The quality and stability of dispersion depends upon the interaction between the static field around the organic particle and the aqueous stati-field at the interface with the continuous phase. The strength of this static field affects hydration because particles having a strong field display less hydration in alkaline media. Also particle charge strength affects migration rate and speed of deposition.

EXAMPLE I (A) Polymerization

An epoxy-tall oil ester resin is made by charging to a reaction kettle 290 parts by weight of a monomer which is the reaction product of epichlorohydrin and bisphenol-A (Union Carbide ERLA 2773) having the structural formula:

To this is added 167 parts bisphenol-A monomer (4,4′-isopropylidendiphenol), 7.35 parts tall oil acids (1% rosin), 0.67 part lithium naphthenate catalyst (1.4% metal), and 18.62 parts xylene. The reaction mixture is heated to 380° F. and reacted under reflux for 1.5 hours, during which period the exothermal conditions raise the temperature 90–100° F. The batch is maintained at 470° for 0.5 hour after which 412.26 parts of tall oil acids and 1.25 parts triphenyl phosphite are added and the mixture heated slowly to 480–490° F. over 2.75 hours and held at 480° for 1 hour. The batch is then cooled while refluxing to 450° during 1.5 hours. The acid value is measured during a holding period of 2.75 hours and falls from 30 to 12–14 a.v., after which the batch is cooled to 240–250° F. over 1.75 hours. (The polymer at this point is later referred to as epoxyester A.) Then is added 26.10 parts morpholine, 65.20 parts N,N-dimethyl lauramide, and 9.55 parts silicone (L-75). The polymer with dispersant is maintained at 240–250° for 0.5 hour and cooled. The yield is 970 parts by weight of clear resin containing 98% solids. The average molecular weight of the polymer is about 18,000.

The function of the morpholine in this reaction is to inactivate free acid groups. The silicone resin aids in preventing cratering of the coating when electrodeposited, and enhances edge covering. The polymeric material is adherent to metal substrates and can be cured to a hard protective coating by subsequent baking.

(B) Formulation of a concentrated pigmented coating composition

The polymeric vehicle of Example I(A) is pigmented and diluted to make a typical electrocoating concentrate. On a high speed Cowles mill, 126.33 parts by weight of the polymeric mixture above is mixed with 18.0 parts of channel black carbon pigment (Mogul A) and 33.5 parts of odorless mineral spirits (straight chain alkanes). This mixture is then passed over a 3-roll mill, further dispersing the pigment in the polymer. To this mixture is added 252.67 parts of the polymeric mixture (Example I(A). After a second mixing in the Cowles mill, a solution of 2.8 parts ethanolamine in 424.37 parts of de-ionized water is mixed with the pigmented polymer while holding the mixture at about 50–85° C. This product contains about 50 wt. percent solids and is a suitable concentrate for addition to electrocoating baths, either for enriching a depleted bath or for initial charge. The mineral spirits component of the concentrate facilitates emulsification and assists stabilization of the dispersion during electrocoating.

(C) Electrocoating processes and apparatus

The concentrated pigment-containing vehicle of Example I(B) is further diluted to 5 wt. percent nonvolatile matter (NVM) with water. This dilution uses about 10 volumes of water per volume of concentrate. The pH is adjusted to 8.9 to 11 with ethanolamine, pH 10 being optimum. The formation of a desired particle size can be effected by sonic agitation. Once the organic phase is dispersed in the aqueous bath with the desired particle size, the dispersion will remain stable for long periods. Individual particles can tend to agglomerate under some adverse conditions on standing for long periods of time, but the dispersion usually remains relatively stable. Occasional re-sonolation, for instance 60 to 90 minutes each day, is sufficient to maintain the original particle size.

Figure 1:
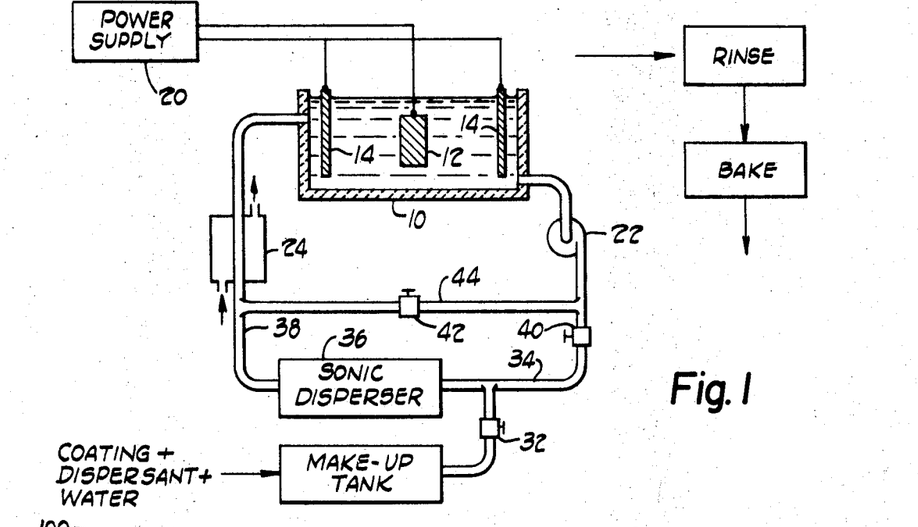
FIG. 1 is a schematic diagram of a typical electrocoating system.

Referring to FIG. 1, an open tank 10 is filled with a dilute aqueous coating bath containing a dispersed polymeric phase. A conductive substrate 12 and electrodes 14 are immersed in the bath and electrically connected to a power supply 20. The work piece 12 to be coated is biased anodically and the electrodes 14 are biased cathodically. After the desired coating is obtained the work piece is removed from the bath, rinsed by dipping or spraying and cured by baking. The rinsing removes adhering solids and liquids from the electrodeposited surface. Surfactants are not needed in the rinse. The polymer described in Example I(A) can be baked at 150 to 260° C. for 5 to 20 minutes to obtain a hard corrosion resistant black film. In an ordinary process operated according to this invention the dragout solids, if unrinsed, amount to about 10 to 15% of the electrodeposited film. However, the film portion formed from dragout solids is not of the same quality as that electrocoated and rinsing is desirable. Operating the process with a bath having low solids content minimizes the amount of material lost through dragout.

Dissipation of electrical energy during continuous operation of the tank causes a temperature rise which needs to be controlled. The bath is withdrawn from tank 10 and circulated by pump 22 to a heat exchanger 24, which maintains the bath within an operating range of 0 to 40° C., preferably 25 to 30° C. Addition of concentrate to the bath to replace depleted material is effected by introducing the agitated concentrate from make-up tank 30 through feed valve 32 into conduit 34, where the mixture of depleted bath and concentrate is dispersed by sonic disperser 36, connected to the coating tank through conduit 38. If it is desired to by-pass the sonic dispersing step with the recirculated bath, this can be achieved by closing valve 40 in conduit 34 and opening valve 42 in by-pass conduit 44 to circulate the withdrawn bath directly to heat exchanger 24.

Conventional power supplies, dispersing, material handling, rinsing and baking equipment now used in the polymeric electrocoating industry can be used in practicing this invention.

The power supply provides a source of direct current potential having a voltage output of about 50 to 500 v. DDC, preferably 100 to 250 v. DC, and capable of producing up to several hundred amperes per square meter of immersed surface of the article to be coated. A silicon-controlled rectifier having full wave output is suitable for this purpose. This power supply can be a full wave bridge with or without a filter. The voltage transients may include an intermittant voltage, constant DDC, or an alternating component superimposed on a direct current component.

The disperser is preferably of the sonic energy type. A sonolator of the vibrating reed type having a pressure drop across the sonic cavity of about 500–600 p.s.i. has been found satisfactory. This type of disperser provides a satisfactory initial particle size for the dispersed organic phase and maintains the optimum size with only occasional homogenizing of the bath; however, a portion of the bath may be withdrawn and re-sonolated continuously if desired. The same piece of equipment is used for maintaining dispersion of a bath and for make-up.

Electrode spacing is not a critical factor in apparatus design. Anode-cathode separations from a few millimeters to over a meter are possible, with the preferred range being 2–50 cm. and the optimum range being 20–30 cm. Likewise there is considerable latitude in the area ratio of cathode to anode surface. This ratio includes practical designs within the range of 5:1 to 1:25, with 1:1 to 1:10 being preferred and 1:4 being considered optimum for the composition described in Example I.

One advantage of the present process which provides for lower equipment costs is the small volume of bath needed for a given area of coated surface. In conventional polycarboxylic acid solution electrocoating an accepted volume:anode area ratio is 100 cm. (25 U.S. gallons/sq. ft.); whereas, in the present process the volume: area ratio as little as 12 cm. (3 gal./sq. ft.) has been used continuously for long periods. Accordingly, an extremely high throughput of coated area can be achieved from a small coating tank using this invention, and inventories of coating material are substantially reduced.

EXAMPLE II

A coating composition is formulated using the eqoxyester A polymer of Example I(A). Using epoxyester A, 423 parts of the polymer is reacted with 12.7 parts of morpholine to lower the acid value and 4.2 parts of L-75 silicone and 63.5 parts of Hallcomid M18-OL dispersant (80% N,N-dimethyl oleamide and 20% mixed N,N-dialkyl long chain amides) are added. This mixture is admixed with 130 parts red iron oxide and dispersed in water containing 28.2 parts free ionizable morpholine to obtain a solids content of 3% NVM. The bath pH is 9.8 and electrical resistivity is 6020 ohm-cm.

The above material is coated on galvanized steel electrophoretically at 175 v. D.C. to deposit a self-terminating film 40 microns thick. The coated substrate passed a standard ASTM 210 hour corrosion test using 5% aq. NaCl at 38° C.

EXAMPLE III

Epoxyester A is adapted as the vehicle for a mixed pigment coating bath by heating 120 parts of the polymer with 3.6 parts morpholine to reduce the acid value of the polymer. The polymer is then mixed on a roll mill with 1.2 parts L-75 silicone, 18.0 parts Hallcomid M18-OL dispersant, 6.4 parts carbon black and 0.04 part basic lead silicachromate pigment. This paste is dispersed in 3247 parts of water with 4.28 parts morpholine base, which produces an electrocoating bath having pH 9.45 and resistivity of 6960 ohm-cm. The non-volatile material in the bath is 3.7%.

A copper-coated steel part was anodically coated at 180 v. D.C. and produced a highly protective coating which passes a standard salt spray test in excess of 96 hours without failure of the coating.

EXAMPLE IV

A paste similar to that of Example III is made by reacting 423 parts of epoxyester A with 12.7 parts morpholine and mixing with 4.3 parts silicone resin and 130.0 parts red iron oxide ("1646"). Table I compares the dispersion stability and electrodeposit quality of several N,N-dimethyl amides. The coating bath is made by dispersing 126 parts of the paste with 0.63 part (0.5%) or 1.26 parts (1%) of dispersant in 1880 parts water containing 5 parts 2N LiOH in the aqueous phase. The dispersion stability and deposit quality are each evaluated on a 0–10 scale, with 10 being the highest rating. The dispersants consist of the following compounds: M-6, 90% N,N-dimethyl caproamide, 10% N,N-dimethyl caprylamide; M-8-10, 50% N,N-dimethyl caprylamide, 5% N,N-dimethyl caproamide, 40% N,N-dimethyl capramide, 5% N,N-dimethyl lauramide; M-12, 95% N,N-dimethyl lauramide, 3% N,N-dimethyl myristamide, 2% N,N-dimethyl capramide; M-14, 95% N,N-dimethyl myristamide, 3% N,N-dimethyl palmitamide, 2% N,N-dimethyl lauramide; M-18, 50% N,N-dimethyl stearamide, 40% N,N-dimethyl palmitamide, 5% N,N-dimethyl myristamide, 5% N,N-dimethyl oleamide; and M-18-OL, 80% N,N-dimethyl oleamide, 5% N,N-dimethyl myristamide, 5% N,N-dimethyl palmitamide, 5% N,N-dimethyl stearamide, 5% N,N-dimethyl linoleamide.

TABLE IA
[Paste/dispersant ratio=0.5%]

| Dispersant | M-6 | M-8-10 | M-12 | M-14 | M-18 | M-18OL |
|---|---|---|---|---|---|---|
| Bath pH | 9.6 | 0.0 | 9.9 | 9.8 | 10.1 | 9.9 |
| Bath resistivity | 8,400 | 4,250 | 5,750 | 5,600 | 5,780 | 5,338 |
| Dispersion stability | 6 | 8 | 8 | 8 | 9 | 9 |
| Deposit quality | 7 | 9 | 9 | 9 | 9 | 0 |

TABLE IB
[Paste/dispersant ratio=1.0%]

| Dispersant | M-6 | M-8-10 | M-12 | M-14 | M-18 | M-18-OL |
|---|---|---|---|---|---|---|
| Bath pH | 9.6 | 9.9 | 9.9 | 9.8 | 10.0 | 10.1 |
| Bath resistivity | 5,800 | 5,500 | 7,500 | 6,750 | 5,500 | 6,000 |
| Dispersion stability | 8 | 8 | 8 | 8 | 8 | 9 |
| Deposit quality | 8 | 9 | 9 | 9 | 9 | 8 |
| Dispersant dipole (muvg.) | 3.60 | 3.75 | 3.75 | 3.71 | 3.82 | 4.09 |

EXAMPLE V

Vinyl coatings are applied to conducting substrates from electrocoating baths using mixed dispersants. A resin concentrate solution is made using 60 parts Type VMCC vinyl polymer containing about 87% vinyl chloride and 13% vinyl acetate, with 1% maleic anhydride added to improve adhesion, plus 40 parts of Type VYHD vinyl polymer containing about 87% vinyl chloride and 13% vinyl acetate. These polymers are dissolved in 100 parts each of methyl ethyl ketone and methyl isobutyl ketone. Table II shows five coating compositions made from the vinyl concentrate solution. The compositions are expressed in parts by weight.

TABLE II

| Number | 1 | 2 | 3 | 4 | 5 |
|---|---|---|---|---|---|
| Vinyl solution | 20 | 20 | 20 | 20 | 20 |
| M-12 dispersant | .5 | .5 | 3 | 0 | 0 |
| Ethylene glycol ethyl methyl ether | 0 | 0 | 0 | 1 | 0 |
| Ethanol amine | .2 | .1 | .1 | .1 | .1 |
| Water | 200 | 200 | 200 | 200 | 200 |
| pH | 10.5 | 9.95 | 9.8 | 10.1 | 10.2 |
| Resistivity (ohm-cm.) | 6,050 | 9,500 | 7,850 | 12,000 | 17,000 |

Good deposits were made electrophoretically from the above baths at 220 v. DC. These compositions are useful for coating stock materials which are subsequently formed by pressing. Such coil coatings are flexible and have good corrosion resistance after heating to fuse the resin.

EXAMPLE VI

A mixed polymer vehicle is made using epoxyester A and a water-solubilized polyester containing carboxylic acid groups. A cross-linking agent is codeposited with the polymers and cured by baking. The mixed solution-emulsion system is made by heating 150 parts of epoxyester A with 150 parts of a soluble styrene-maleic adduct to 150° C. with slow agitation. After holding for 5 minutes, 16 parts hexakis(alkoxyalkyl)melamine (Cymel 301) and 4.5 parts morpholine are mixed for 2 minutes with good agitation. To this mixture is added 48 parts of ethylene glycol methyl tert-butyl ether dispersant, which is mixed for another 5 minutes. The polymeric mixture is cooled to room temperature and mixed with 49 parts titanium dioxide pigment and 0.45 part carbon black pigment on a roll mill.

A coating bath is made by dispersing the pigmented polymer in an aqueous phase containing 13 ml. of 0.083 g./ml. LiOH·H₂O solution with sufficient added water to dilute the bath to 10% NVM. The bath pH is 8.5 and resistivity is 1900 ohm-cm. The polymers, additives and pigments were codeposited by electrophoresis and baked to cross-link the prepolymer by reaction of the melamine additive with free hydroxyl groups in the prepolymer. A grey film of good quality was produced.

EXAMPLE VII (A) An alkyd polymer is made by reacting 1040 parts of coconut oil (lauric acid triglyceride) with 365 parts glycerine at about 230° C. To this transesterification product is added 465 parts glycerine, 1700 parts phthalic anhydride, 217 parts 4-tert-butyl benzoic acid and 200 parts propylene glycol. The above monomers are reacted in xylol solvent at 215° C. to an acid value of about 6–9. The polymeric product is 98% solid and 2% volatile solvent. This polymer contains free hydroxyl groups which provide sites for cross-linking with a melamine-type compound. A typical mixture of prepolymer and cross-linking agent contains 70 wt. percent alkyd and 30% hexakis (alkoxyalkyl)melamine (e.g., Cymel 301).

(B) Acetone is selected as a dispersant compound for this resin because of its inertness toward brass substrsate. A polymer-mixture:dispersant ratio of 10:1 is used to disperse the organic materials in an alkaline water bath. The electrodeposited and cross-linked polymer is a durable clear coating suitable for metallic substrates having a specular finish. This alkyd polymer is useful as a vehicle for pigmenting with metallic aluminum particles to provide a silvery appearance for conductive articles.

EXAMPLE VIII

The alkyd polymer described in Example VII(A) is used as the vehicle in a white paint formulation by mixing 378 parts of the prepolymer with 67 parts of M–18–OL amide dispersant, 114 parts Cymel 301 melamine cross-linking agent, and 204 parts of titanium dioxide pigment (OR–600) on a three roll mill. The above paste was dispersed in an aqueous bath at 5% solids and deposits were made at 200 v. DC.

EXAMPLE IX

A film forming monomer is coated onto a metal substrate by electrocoating. A cycloaliphatic compound (Union Carbide ERL–289) containing two epoxy groups was dispersed as an organic phase in alkaline water using N,N-dimethyl lauramide. A liquid film was anodically deposited.

Deposition of organic compounds which later are reacted in situ on the conductive substrate is an alternative method to direct coating with polymers. Selection of an inert dispersant is important because the organic particles deposited contain a mixture of compounds, one or more of which can be deleterious to the film-forming properties of the coating.

Corrosion tests

The preferred film-forming material for protecting base metal is the epoxyester polymer described in Example I(A). The black coating in Example I protects bare steel in an ASTM salt spray test where 300 hours was passed with a coating about 12 microns thick. A 20–30 micron coating over Bonderite 37 steel passed a 1000 hour test. The red epoxyester coating in Example II at 25–35 microns thickness portected a Bonderite 100 steel panel for 700 hours and Q-steel for 600 hours. Copper-clad steel is an especially difficult substrate to coat electrochemically. The combination of metals forms a galvanic cell which cannot be protected adequately by known organic electrodeposited coating. Salt spray tests of 100–300 hours and longer were passed using the epoxyester material.

Dispersant compounds

Evaluation of various dispersant compounds using a standard procedure was conducted. Unless otherwise stated the polymer dispersed and deposited is epoxyester A that of Example I. The weight ratio of polymer to dispersant is 10:1 and the alkaline water phase contains 0.7 eq. LiOH/gram of solids. Stability of the dispersion and anodic electrocoating were studied at about 5% NVM for the diluted bath.

(1) Benzophenone ($\mu_{liq}=2.95$; $\epsilon_{50°\,C}=11.4$) was found to be an excellent aromatic ketone dispersant. Although it is normally solid at process temperatures for electrocoating, it is miscible with the polymer and shows high stability and deposit quality.

(2) Acetone ($\mu_{liq}=2.74$; $\epsilon_{25}=20.7$) has only fair dispersion stability and coating quality is poor. Acetone is completely water soluble.

(3) Ethyl acetoacetate ($\mu_{gas}=2.98$) has only fair stability and deposits. Its ester may strongly affect the proton acceptance ability of the ketone group.

(4) Acetophenone ($\mu_{gas}=3.02$; $\epsilon_{25}=17.4$) produced both good stability and deposits. Its properties are intermediate between benzophenone and acetone.

(5) Nitrobenzene ($\mu_{liq}=3.98$; $\mu_{gas}=4.27$; $\epsilon_{25}=34.8$) has excellent dispersion stability and deposit quality; but, the toxicity of this benzenoid poses operational problems.

(6) A homolog of nitrobenzene, 3-nitrotoluene, was found to have similar physical properties to the parent compound and also produced excellent dispersion stability and deposits.

(7) Chlornitrobenzene was studied to determine the effects of position isomerism in benzenoids. The ortho compound ($\mu_{gas}=4.64$; $\epsilon_{50}=37$) completely emulsified the polymer with high stability and produced excellent deposits. The para isomer ($\mu_{liq}=2.97$, $\mu_{gas}=2.03$; $\epsilon_{120}=8$) dispersed only a small part of the polymer and no electrodeposits were produced. The relative positions of the chloro and nitro substituents appear to strongly affect the ability of the molecule to accept a proton, even though the dipole moment of both isomers is above that of water.

(8) Benzonitrile ($\mu_{liq}=4.0$, $\mu_{gas}=4.4$; $\epsilon_{25}=25.2$) is typical of the class of nitriles useful as polar dispersants. This compound produced very good dispersion stability and excellent electrodeposits.

(9) Acetonitrile ($\mu_{liq}=3.4$, $\mu_{gas}=3.9$; $\epsilon_{20}=37$) likewise possesses very good characteristics as a dispersant.

Operating variables

A series of expirements was designed to demonstrate the effects of applied voltage, bath concentration, and electrocoating time on the system. In the data presented, film accumulation is based on adherent coating measured by weighing the substrate, electrocoating, rinsing nonadherent materials, baking the electrocoated film at standard conditions to remove volatile components, and reweighing the coated substrate. Coulombic measurements were made by integrating a time-ampere chart. The epoxyester polymer with additives described in Example IA was dispersed in an alkaline bath containing ethanolamine in these studies.

A dispersion containing 9.8% NVM (solids) and having a pH of 9.6 and resistivity of 1800 ohm-cm. was electrocoated onto standard bonderized steel panels at voltages from 100 to 200 v. DC. This test was conducted for 60 seconds in a test cell having 1:1.2 anode-cathode ratio and electrode spacing of 2.5 cm. Table III shows the results of five runs. The direct current potential was applied from a full wave rectifier and voltages are RMS values.

TABLE III

| Applied potential (volts DC): | Film accumulation (gm./m.$^2$) |
|---|---|
| 100 | 11.4 |
| 125 | 21.4 |
| 150 | 30.2 |
| 175 | 42.2 |
| 200 | 53.0 |

Figure 2:
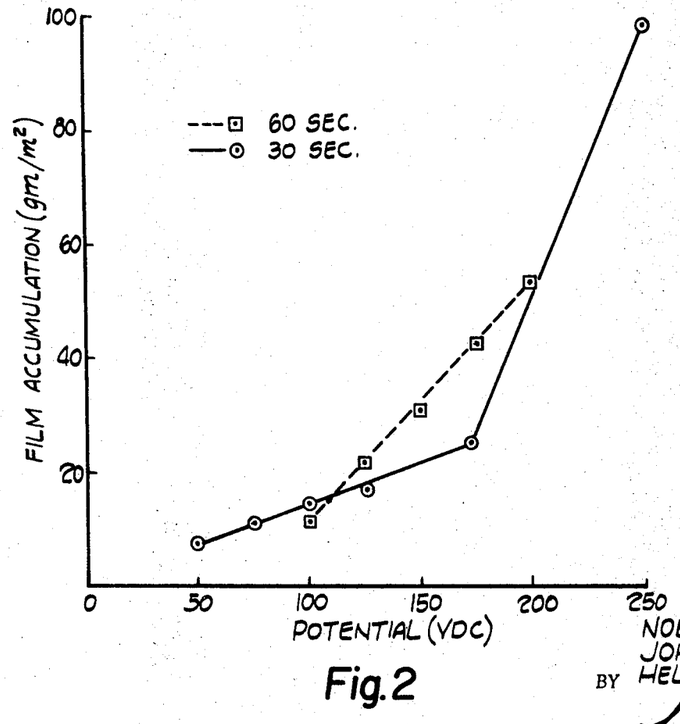
FIG. 2 is a linear plot showing effects of coating potential on film accumulation for two series of tests.

This data is plotted in FIG. 2 and shows that film accumulation for a given period of time (60 sec.) increases linearly with voltage under these test conditions.

Figure 3:
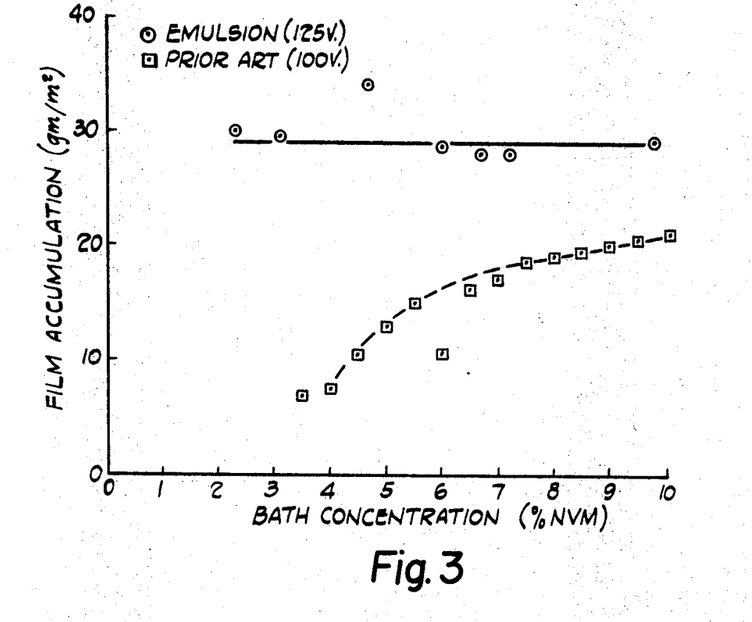
FIG. 3 is a linear plot showing effects of bath concentration on film accumulation for a typical emulsion bath and a typical prior art solubilized bath.

The effect of bath solids concentration upon film accumulation and electrical efficiency was studied at constant voltage (125 v. DC.) The initial bath pH was set at 9.8 for each run by adjusting the amount of ethanolamine. The epoxyester dipsersion data are shown in Table IV, which is ploted in FIG. 3 of the drawing.

TABLE IV

| Bath solids (NVM): | Film accumulation (gm./m.$^2$) |
|---|---|
| 2.3 | 30.0 |
| 3.1 | 29.5 |
| 4.7 | 34.0 |
| 6.0 | 28.5 |
| 6.5 | 28.0 |
| 7.2 | 28.0 |
| 9.8 | 29.0 |

Both film accumulation and electrical efficiency are observed to remain essentially constant under the test conditions for the epoxyester.

The epoxyester data of Table IV was compared to a typical alkali-solubilized polycarboxylic acid electrocoating resin at 100 v. DC applied potential and pH 8.3. The resistivity for this bath was 850 ohm-cm.; otherwise, conditions were substantially the same as for the epoxyester test runs. These data are presented in Table V and FIG. 3 for a 60-second coating period. The resin comprises an acrylic prepolymer having an acid value of about 100. This prepolymer is codeposited with hexakis (alkoxyalkyl) melamine cross-linking agent.

TABLE V

| Bath solids (NVM): | Film accumulation (gm./m.$^2$) |
|---|---|
| 10.1 | 21.0 |
| 9.5 | 20.5 |
| 9.0 | 20.0 |
| 8.5 | 19.5 |
| 8.0 | 19.0 |
| 7.5 | 18.5 |
| 7.0 | 17.0 |
| 6.5 | 16.0 |
| 6.0 | 10.5 |
| 5.5 | 15.0 |
| 5.0 | 13.0 |
| 4.5 | 10.5 |
| 4.0 | 7.5 |
| 3.5 | 7.0 |

Solids contents of the electrocoating bath has a distinct effect on film accumulation for this system, with the weight of film deposited during a fixed time period being approximately proportional to the concentration of solubilized resin in the bath. Electrical efficiency appears to increase slightly with solids content; but, the weight of coating per coulomb expended is far less than for the epoxyester system described above.

A series of experiments was conducted to determine (1) effects on film accumulation rates by applied deposition potential, (2) current density changes with time and film build, and (3) electrical efficiency changes with applied potential. Comparisons were made with a prior art solubilized coating system. The emulsion coating bath was studied using the epoxyester resin A under conditions similar to that described for Table III. The bath concentration was 10.9 wt. percent solids. The pH varied from 10.75 (starting) to 10.4 (partially depleted), and the resistivity dropped from about 2300 ohm-cm. to 1850 ohm-cm. during deposition. The standard cell was different in construction, having electrode spacing of 4.5 cm. and anode:cathode area ratio of 1:1.

In FIG. 2 the results of film accumulation at 30 seconds elapsed time is plotted from 50 to 250 v. DC. The curve compares favorably with that of the Table III data, differences in time, cell construction and bath composition account for the different curves. FIG. 2 demonstrates the advantages of operating the novel emulsion coating process at higher coating voltages. The linear increase in film build in the lower voltage ranges becomes greater in the preferred operating ranges of the system from 175 to 250 v. DC.

Figure 4:
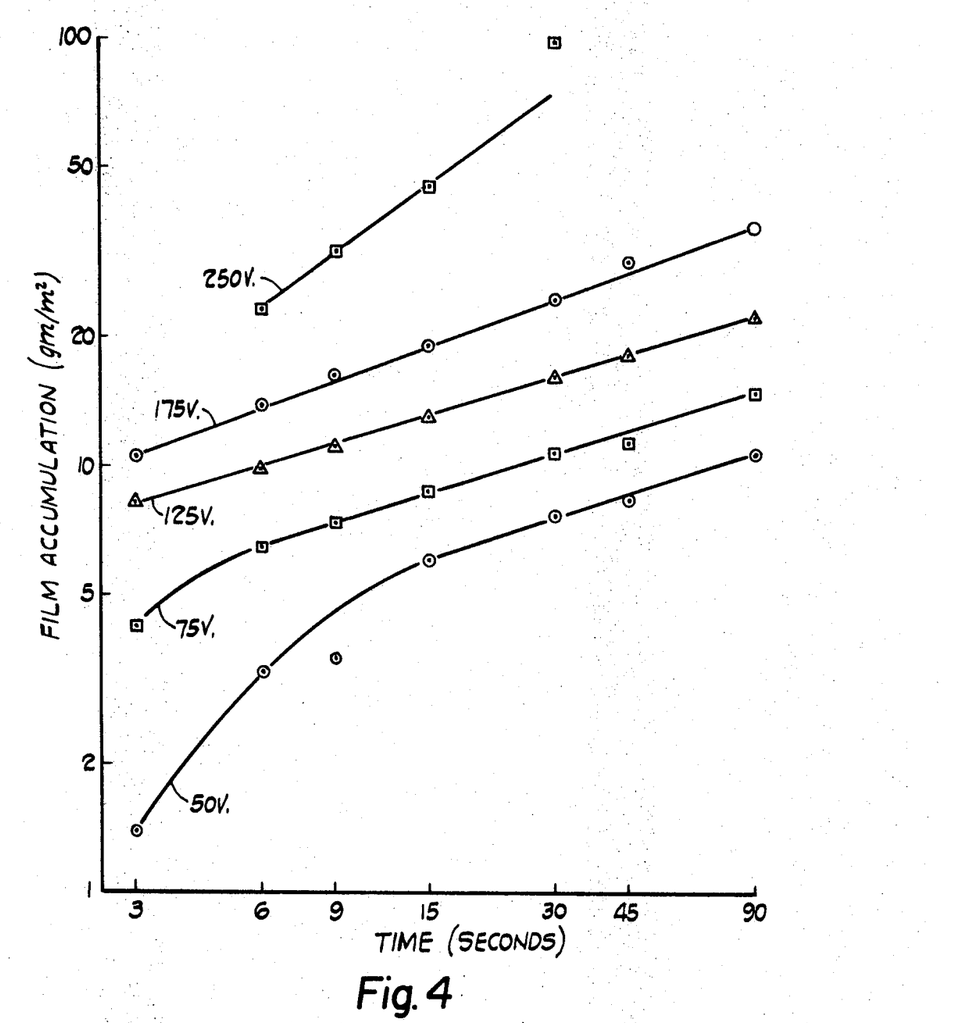
FIG. 4 is a logarithmic plot of film accumulation with time at several deposition potentials.

One of the characteristics of the invention is the deposition of a relatively large amount of coating during the first few seconds of electrocoating at higher voltages. This is demonstrated by the logarithmic plot of film build against deposition time in FIG. 4. The parameter for this study is applied potential. The film accumulation was measured at time intervals from 3 to 90 seconds by terminating the coating process at the desired elapsed time, rinsing the panels and baking under standard conditions. This process gives thin films during the first few seconds at low potentials; but, markedly thicker films are obtained very quickly at higher potential, e.g., above 125 v. DC. In the preferred voltage range, 175 to 250 v. DC, a film of sufficient thickness is deposited within about 10 seconds to provide corrosion protection and decoration. At higher voltage and longer deposition times, gassing can be noted in some emulsion baths. Flow of the epoxyester coating during baking usually covers any evidence of gas evolution in the electrochemical process. Such amounts of gas as released during coating of a typical prior art solubilized resin under high voltage would normally produce permanent damage to the film. Gas evolution during electrophoretic coating is generally undesirable, however, and the present invention provides a wide range of operating conditions which produce good films. The practical upper limit of voltage depends upon the particular bath composition, tank construction, and operating variables used; but most systems studied operated best between 125 and 250 v. DC under the particular conditions of electrode spacing, bath resistivity and pH present in the test facilities.

Figure 5:
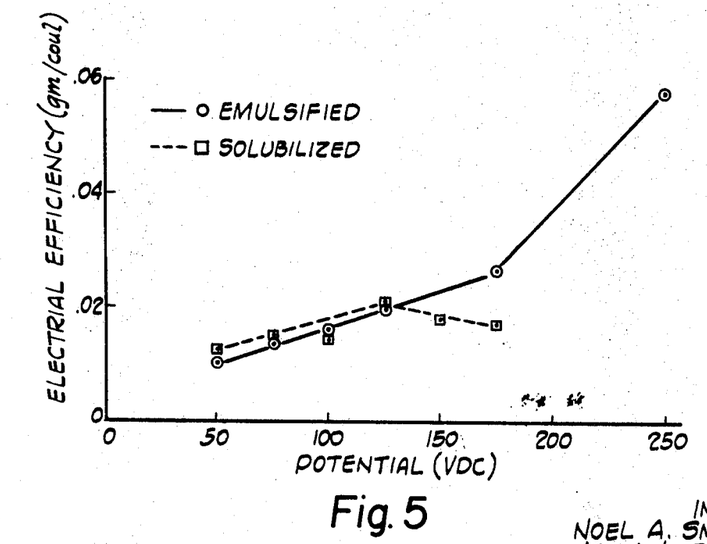
FIG. 5 is a linear plot comparing electrical efficiency of this invention with a prior art composition.

Deposition of material with a small amount of current is a desirable feature of this invention. This is usually rated by the electrical efficiency in grams deposited per coulomb expended. Thirty second runs of epoxyester deposits (same as FIG. 4) were compared with a prior art coating for the same deposition time. FIG. 5 is a plot of results for these standard tests, showing the increase of electrical efficiency with increased voltage for the epoxyester coating. Up to about 125 volts, the efficiency is comparable to that of the solubilized resin coating. The prior art process becomes less efficient at higher voltages due to severe gas evolution. The coulombic measurements were made by area integration of a strip chart recording of the current during deposition. The solubilized resin was an acrylic copolymer consisting of 23.5 parts butyl acrylate, 23.5 parts 2-ethylhexyl acrylate, 7.5 parts methyl methacrylate, 7.5 parts styrene, 18 parts acrylic acid, and 20 parts 2-hydroxypropyl acrylate reacted in butyl cellosolve solvent. The resin acid value was 131. This prepolymer was codeposited with 25% of hexakis (alkoxyalkyl) melamine cross-linking agent. The resin was alkali-solubilized in a water bath at pH 7.6. The bath resistivity was 725 ohm-cm. and solids content was 10% NVM. The same standard cell was used for the epoxyester and acrylic resin tests. Deposits made by electrophoresis at an efficiency above 0.03 gm./coul. have not been found in the published literature. Typical values for electrocoating systems vary from about 0.006–.01 for alkyds, phenolics and melamine blends; .009–.02 for vinyls, and modified alkyds; and 0.02–.03 for acrylics. Efficiencies for the present process can be more than twice that of the best systems known. The deposition runs conducted at 175 v. DC are a good example for processes using the present invention. Complete data is given in Table VI for the operating variables.

TABLE VI

| Time (sec) | Film deposit (gm./sq. meter) | Efficiency (gm./coul.) | Current (amp/sq. m.) |
|---|---|---|---|
| 0+ | | | 272 ($I_0$) |
| 3 | 10.4 | .030 | 62 |
| 6 | 13.8 | .025 | 34 |
| 9 | 16.4 | .026 | 26 |
| 15 | 19.2 | .026 | 19 |
| 30 | 24.5 | .026 | 12 |
| 45 | 29.6 | .023 | 9 |
| 90 | 36.1 | .024 | 6 |

Figure 6:
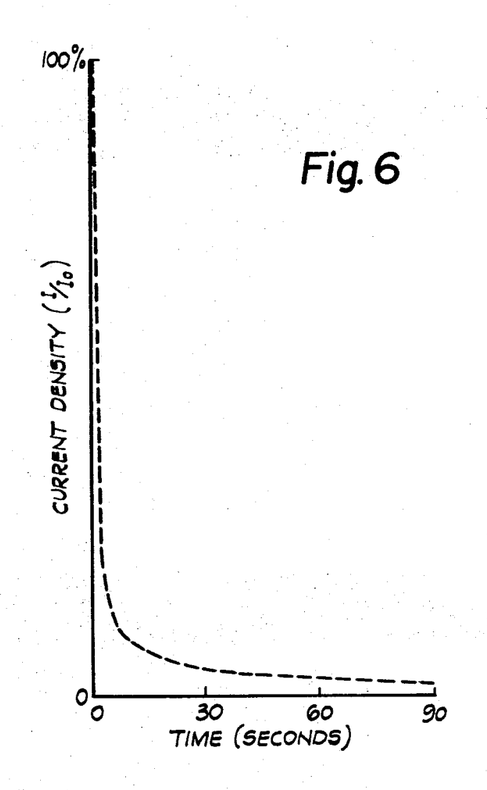
FIG. 6 is a linear plot showing current density decrease with elapsed deposition time.
Figure 7:
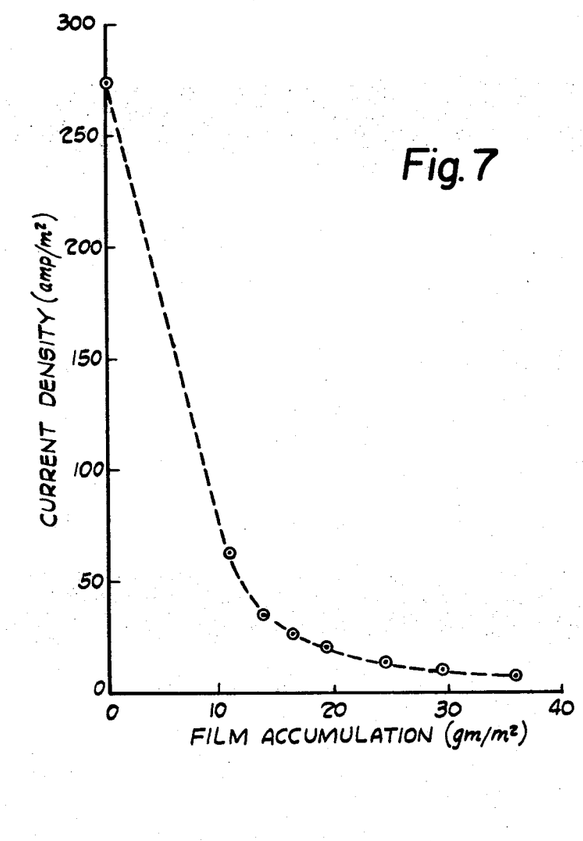
FIG. 7 is a linear plot showing current density decrease with increased film accumulation.

The amount of resin deposited per coulomb expended remains substantially constant throughout the time period from 3 to 90 seconds. The electrical insulating property of the deposited film limits the current flow, resulting in a drastic decrease in current density in the first few seconds of coating. By the time the current has dropped about 95% from its initial value ($I_0$), a film thickness has accumulated that is sufficient for most protective or decorative purposes. At this point ($I/I_0=0.05$), the process has become effectively terminated by its own operation. For a typical commercial process this shutdown period is about 10 to 30 seconds. It has been noted that a major portion of the film at the shutdown point was deposited during the first 25% of the time period. This is shown in FIGS. 6 and 7. FIG. 6 demonstrates the fast drop in current density ratio over the 90 second period tabulated above. The plot in FIG. 7 is the same data, except that current is plotted against film accumulation. These curves are considered to be characteristic of most processes utilizing the novel emulsions of this invention.

The term "self-limiting" has been applied to those insulating films which, due to their electrical resistance, build a film thickness sufficient to suppress further film accumulation after a given thickness has been electrophoretically deposited. The period of time for the film to become effectively self-limiting or self-terminating is considered the shutdown time. For such systems some further film is accumulated after the film deposition process is considered terminated; but, such amounts are unnecessary for most practical uses. In order to adopt a standard shutdown period for this invention, it is established that there is no substantial film accumulation after the maximum current density at the beginning of electrodeposition has decreased by 95%. Where $I_0$ is the initial current and $I_s$ is the current at the shutdown point, the shutdown period is the interval between time at the shutdown point $(t_s)$ and the time of initiating electrodeposition $(t_0)$, and shutdown time $(t_s - t_0)$ is defined as the time during which the current density ratio $I/I_0$ decreases from 1 to 0.05. At this point the effective self-limited film accumulation is reached.

The invention has been described by specific examples, but there is no intent to limit the inventive concept except as set forth in the following claims.

What is claimed is:

1. A process for coating a conducting substrate with a thin film of polymeric material comprising the steps of:
   (1) dispersing in an alkaline aqueous bath a polymer-containing phase consisting essentially of a water-insoluble organic polymer of acid value less than about 15 and a volatile non-ionizable dispersing agent capable of dispersing the organic polymer in the aqueous bath, said dispersing agent having a dipole moment of at least 1.84 Debye units and having a proton acceptor group;
   (2) contatcing the substrate with the bath; and
   (3) biasing the conducting substrate anodically with a direct current potential to deposit the polymeric material as a self-terminating electrically-insulative film.

2. The process of claim 1 wherein the aqueous bath contains alkali metal ions, ammonium ions, or amine.

3. The process of claim 1 wherein the polymer-containing phase includes pigment particles.

4. The process of claim 1 wherein the dispersing agent contains a compound selected from the group consisting of ethylene glycol ethyl methyl ether, N,N-dimethyl-amides, acetone, benzophenone, acetophenone, methyl ethyl ketone, methyl isobutyl ketone, nitrobenzene, nitrotoluene benzonitrile, acetonitrile, ethyl acetoacetate, and chloronitrobenzene.

5. The process of claim 1 wherein the polymer consists essentially of an epoxyester reaction product of a diepoxy, tall oil acids and a polyol.

6. The process of claim 1 wherein the aqueous bath has a pH of at least 8.9.

7. The process of claim 1 wherein an electrically insulating thickness of electrodeposited polymer is accumulated within 30 seconds and wherein deposition current density decreases at least 95% from its initial value within 30 seconds.

8. In the process of electrocoating a non-ionic film-forming material onto a conducting substrate from a stable alkaline aqueous emulsion mixture, wherein the film-forming material has an acid value less than about 15 and is present in a dispersed organic phase having a particle size less than 100 microns, the improvement which comprises
   mixing the film forming material with a non-ionizable dispersing agent in the organic phase, said dispersing agent consisting essentially of an organic compound or mixture of compounds having a dipole moment greater than 2 Debye units, said dispersing agent being chemically compatible with the film-forming material.

9. The process of claim 1 wherein the dispersing agent consists essentially of an organic amide, substituted benzenoid, ketone, nitrile, ether, ester, or halogenated hydrocarbon.

10. The process of claim 8 wherein the dispersing agent contains a proton acceptor group and does not undergo substantial hydrogen bonding, and wherein the dispersing agent has a dielectric constant less than 40.

11. The process of claim 8 wherein the dispersing agent consists essentially of substantially water-insoluble N,N-dialkyl amide in an amount sufficient to constitute about 5 to 10 weight percent of the organic phase to provide a stable two-phase system.

12. A process of coating a conducting substrate with a film of non-conducting polymeric material comprising the steps of:
   dispersing a non-ionizable organic polymer having an acid value of less than about 15 and a molecular weight of at least 1500 in an alkaline aqueous bath by mixing the polymer with a water-insoluble N,N-dialkyl amide dispersing agent miscible with the organic polymer in a dispersed organic phase, said dispersing agent having a dipole moment between about 2 and 5 Debye units and a dielectric constant between about 10 and 40;
   immersing the conducting substrate in the bath as an anodic electrode in a direct current circuit;
   applying a direct current potential to the conducting substrate to deposit the polymer;
   removing the coated substrate from the bath; and
   heating the film to produce a cured coating.

13. The process of claim 12 wherein the non-ionizable organic polymer consists essentially of a diepoxy, tall oil acids and a polyol and comprises the major portion of the cured coating.

14. The process of claim 13 wherein the organic phase contains pigment particles.

15. The process of claim 12 wherein the dispersing agent consists essentially of N.N-dimethyl caproamide, N,N-dimethyl caprylamide, N.N-dimethyl capramide, N,N-dimethyl lauramide, N,N-dimethyl myristamide, N.N-dimethyl palmitamide, N.N-dimethyl oleamide, N,N-dimethyl linoleamide or mixtures of these amides.

16. The process of claim 12 wherein the aqueous bath has a pH of about 8.9 to 11, wherein the total non-volatile materials constituting the bath is about 0.5 to 10 weight percent, and wherein the dispersing agent can be removed from the film by heating to a curing temperature below 300° C.

17. The process of claim 12 wherein a weight ratio of non-volatile material to dispersing agent is maintained in the range of about 5:1 to 200:1 to provide a stable two-phase system.

18. The process of claim 12 wherein the aqueous bath has an electrical resistivity of about 800 to 9200 ohm-cm. and a pH of about 9.5 to 11.

19. A method for depositing an electrically insulating polymeric material on an electrically conductive article comprising the steps of:
   contacting the article with an alkaline aqueous bath containing a dispersed organic phase, said organic phase containing a water-insoluble electrically insulating organic polymer having acid value less than 15 and containing a stabilizing amount of a non-ionizable dispersing agent that is capable of suspending the polymeric material in alkaline water, said dispersing agent having a dipole moment above that of pure water and a dielectric constant below that of pure water, said dispersing agent being miscible with the organic polymer in the dispersed organic phase;

maintaining the dispersed organic phase in a particle up to 25 microns diameter; and anodically biasing the conductive article with a direct current potential to effect electrophoretic migration of the organic phase particles toward the electrically biased article to deposit a self-terminating organic coating of which a major portion of the adherent dry coating thickness accumulated up to the shutdown time is deposited within the first 25% of the shutdown period, said shutdown time being defined as the period during constant potential operation in which the current density decreases by 95% from its initial value.

20. In the process for electrophoretically depositing an organic non-ionizable, water insoluble film-forming material having acid value below 15 from a dispersion of the film-forming material in alkaline water, the improvement which comprises:

mixing the organic film-forming material with a stabilizing amount of a disperstant consisting essentially of at least one polar compound having a dipole moment between 2 and 5 and a dielectric constant between 10 and 40, said polar compound being a proton acceptor and being substantially inert to the film-forming material.

21. The process of claim 20 wherein the polar compound is selected from the group consisting of N.N-dialkyl amides, ketones, halogenated hydrocarbons, nitrohydrocarbons, ethers, and nitriles having a dipole moment between 2.9 and 4.7.

22. The process of claim 20 wherein the film-forming material comprises an organic polymer having an acid value lower than 15.

23. The process of claim 20 wherein a ratio of film-forming material to dispersant is maintained between 200:1 and 5:1, and wherein the alkaline water is maintained at a pH above 8.5.

24. The process of claim 20 wheerin a potential of 175 to 250 v. DC is maintained across the dispersion.

References Cited

UNITED STATES PATENTS

| | | | |
|---|---|---|---|
| 3,399,126 | 8/1968 | Turner | 204—81 |
| 3,410,773 | 11/1968 | Hagan et al. | 204—181 |
| 3,455,805 | 7/1969 | Smith et al. | 204—181 |

OTHER REFERENCES

Hagan, Journal of Paint Technology (August 1966), vol. 38, No. 499, pp. 436–439.

HOWARD S. WILLIAMS, Primary Examiner